United States Patent
Ward

(10) Patent No.: US 12,445,584 B2
(45) Date of Patent: Oct. 14, 2025

(54) SUPPORTING MULTI-VIEW VIDEO OPERATIONS WITH DISOCCLUSION ATLAS

(71) Applicant: Dolby Laboratories Licensing Corporation, San Francisco, CA (US)

(72) Inventor: Gregory John Ward, Berkeley, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 18/009,905

(22) PCT Filed: Jun. 16, 2021

(86) PCT No.: PCT/US2021/037527
§ 371 (c)(1),
(2) Date: Dec. 12, 2022

(87) PCT Pub. No.: WO2021/257639
PCT Pub. Date: Dec. 23, 2021

(65) Prior Publication Data
US 2023/0224447 A1 Jul. 13, 2023

Related U.S. Application Data

(60) Provisional application No. 63/039,595, filed on Jun. 16, 2020.

(30) Foreign Application Priority Data

Jun. 16, 2020 (EP) ..................................... 20180179

(51) Int. Cl.
*H04N 13/161* (2018.01)

(52) U.S. Cl.
CPC ................................. *H04N 13/161* (2018.05)

(58) Field of Classification Search
None
See application file for complete search history.

(56) References Cited

U.S. PATENT DOCUMENTS

| | | |
|---|---|---|
| 7,020,668 B2 | 3/2006 | Matsuda |
| 8,666,146 B1 | 3/2014 | Smolic |
| | (Continued) | |

FOREIGN PATENT DOCUMENTS

| | | |
|---|---|---|
| WO | 2009001255 A1 | 12/2008 |
| WO | 2013168091 A1 | 11/2013 |
| | (Continued) | |

OTHER PUBLICATIONS

Mueller, J.H., Voglreiter, P., Dokter, M., Neff, T., Makar, M., Steinberger, M. and Schmalstieg, D., 2018. Shading atlas streaming. ACM Transactions on Graphics (TOG), 37(6), pp. 1-16. (Year: 2018).*

(Continued)

*Primary Examiner* — Clifford Hilaire

(57) ABSTRACT

Occluded image fragments are sorted in size. The largest image fragment is used to size a quadtree node in a layout mask for a disocclusion atlas used to store the image fragments. The sorted image fragments are stored into the disocclusion atlas using the layout mask such as each image fragment is hosted with a best fit quadtree node in the disocclusion atlas. A video signal may be generated by encoding one or more reference images and the disocclusion atlas storing the image fragments. The image fragments can be used by a recipient device to fill disoccluded image data in disoccluded spatial regions in a display image synthesized from the reference images.

18 Claims, 12 Drawing Sheets

(56) References Cited

U.S. PATENT DOCUMENTS

| | | |
|---|---|---|
| 9,041,709 B2 | 5/2015 | Bruls et al. |
| 9,147,221 B2 | 9/2015 | Grasset |
| 9,338,431 B2 | 5/2016 | Lee |
| 9,467,750 B2 | 10/2016 | Banica |
| 10,051,286 B2 | 8/2018 | Grangetto |
| 10,074,012 B2 | 9/2018 | Zhou |
| 10,237,548 B2 | 3/2019 | Korneliussen |
| 10,362,265 B2 | 7/2019 | Pio |
| 10,419,737 B2 | 9/2019 | Pang |
| 2010/0215251 A1 | 8/2010 | Klein Gunnewiek et al. |
| 2013/0127844 A1 | 5/2013 | Koeppel |
| 2013/0326583 A1 | 12/2013 | Freihold |
| 2014/0176553 A1 | 6/2014 | Pettersson |
| 2014/0359152 A1 | 12/2014 | Heng |
| 2015/0350594 A1 | 12/2015 | Mate |
| 2017/0118540 A1 | 4/2017 | Thomas |
| 2017/0318262 A1 | 11/2017 | Safaei |
| 2017/0332064 A1 | 11/2017 | Martineau |
| 2018/0007352 A1 | 1/2018 | Chang |
| 2018/0097867 A1 | 4/2018 | Pang |
| 2018/0109817 A1 | 4/2018 | Wang |
| 2018/0146198 A1 | 5/2018 | Atluru |
| 2018/0199042 A1 | 7/2018 | Wang |
| 2018/0359489 A1 | 12/2018 | Lakshman |
| 2019/0213784 A1 | 7/2019 | Schmalstieg |
| 2019/0373278 A1 | 12/2019 | Castaneda |
| 2020/0021791 A1 | 1/2020 | Hur |
| 2020/0045290 A1 | 2/2020 | Ruhm |
| 2020/0279384 A1 | 9/2020 | Jia |
| 2020/0286293 A1 | 9/2020 | Jia |
| 2020/0288114 A1 | 9/2020 | Lakshman |
| 2023/0215129 A1 | 7/2023 | Ninan |
| 2023/0224447 A1 | 7/2023 | John |

FOREIGN PATENT DOCUMENTS

| | | | |
|---|---|---|---|
| WO | 2017080420 A1 | 5/2017 | |
| WO | 2019055389 A1 | 3/2019 | |
| WO | 2019209838 A1 | 10/2019 | |
| WO | 2019211519 A1 | 11/2019 | |
| WO | 2019243663 A1 | 12/2019 | |
| WO | 2020008106 A1 | 1/2020 | |
| WO | 2021257639 A1 | 12/2021 | |

OTHER PUBLICATIONS

Garcia-Dorado I, Demir I, Aliaga DG. Automatic urban modeling using volumetric reconstruction with surface graph cuts. Computers & Graphics. Nov. 1, 2013;37(7):896-910. (Year: 2013).*

ISO/IEC 23090-2, Information technology—Coded Representation of Immersive Media—Part 2: Omnidirectional Media Format (OMAF) 2nd Edition, 15 pages.

Korea Aerospace University et al., "KAU Response to Immersive Video CE3: Atlas Padding," ISO/IEC JTC1/SC29/WG11 MPEG2020/m52189 (Jan. 2020).

Kwang-Soon Lee, Jeong-Il Seo, "Trends and Prospects of MPEG Immersive Video Standard Technology," IITP, Weekly Technology Trends, Issue 1969, Oct. 21, 2020, 44 pages.

M. Wien, J. M. Boyce, T. Stockhammer, and W.-H. Peng, "Standardization Status of Immersive Video Coding," IEEE JourEmerg. Select. Topics Circuits Syst., vol. 9, No. 1, Mar. 2019, pp. 5-17, 13 pages.

Chen et al., "Test Model 11 of 3D-HEVC and MV-HEVC," ISO/IEC JTC1/SC29/WG11 N 15141, Feb. 2015, Geneva, Switzerland, <https://mpeg.chiariglione.org/standards/mpeg-h/hevc-reference-software/n15141-test-model-11-3d-hevc-and-mv-hevc>.

ITU-T H.264, "Advanced Video coding for Generic Audiovisual Services" Series H: Audiovisual and Multimedia systems, Infrastructure of Audiovisual services—Coding of Moving Video, Jan. 2012.

Shum et al., "A Review of Image-Based Rendering Techniques," Microsoft Research Document, Feb. 2016, accessed May 15, 2023, <https://www.microsoft.com/en-us/research/wpcontent/uploads/2016/02/review_image_rendering.pdf>.

A Review of Image-based Rendering Techniques (https://www.microsoft.com/en-us/research/wpcontent/uploads/2016/02/review_image_rendering.pdf), pp. 1-12.

HEVC-3D standard, 2013-2021 Fraunhofer Heinrich Hertz Institute, pp. 1-2.

"V-PCC Codec Description," MPEG-I VPCC standard, Jun. 17, 2020, ISO/IEC JTC 1/SC 29/WG 7, pp. 1-77.

N15141, Test Model 11 of 3D-HEVC and MV-HEVC (https://mpeg.chiariglione.org/standards/mpeg-h/hevc-reference-software/n15141-test-model-11-3d-hevc-and-mv-hevc), Feb. 2015, pp. 1-58.

* cited by examiner sort image fragments occluded in reference images 422 generate a layout mask for a disocclusion atlas used to store the image fragments 424 store the sorted image fragments into best fit nodes 426 generate a volumetric video signal with the disocclusion atlas 428

*FIG. 4B*

SUPPORTING MULTI-VIEW VIDEO OPERATIONS WITH DISOCCLUSION ATLAS

CROSS-REFERENCE TO RELATED APPLICATIONS

This application is the United States national stage entry of International Patent Application No. PCT/US2021/037527, filed Jun. 16, 2021, which claims priority to U.S. Provisional Application No. 63/039,595, and European Patent Application No. 20180179.2, both filed on Jun. 16, 2020, each of which is incorporated by reference in its entirety.

TECHNOLOGY

The present invention relates generally to image coding and rendering, and in particular, to using disocclusion atlas to support multi-view video operations.

BACKGROUND

View synthesis is used in applications such as three-dimensional (3D) TV, 360-degree video, volumetric video, virtual reality (VR), augmented reality (AR), and so forth. Virtual views are synthesized from existing views with their associated depth information. The existing views can be warped or mapped to a depicted 3D world and then back projected to a target view position.

As a result, background regions occluded by a foreground object in an existing view may be disoccluded (without any available image data from the existing views) in a target view from the target view position, thereby creating gaps or holes in the target view. In addition, discontinuities in depth image(s) can also cause gaps or holes in synthesized views. As the total number of views to be encoded or transmitted in video signals is reduced or minimized in real video display applications, regions of holes in synthesized views generated from the reduced or minimized number of views become relatively large and numerous, thereby creating readily noticeable visual artifacts.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A through FIG. 4C illustrate example process flows; and

DESCRIPTION OF EXAMPLE EMBODIMENTS

Figure 1A:
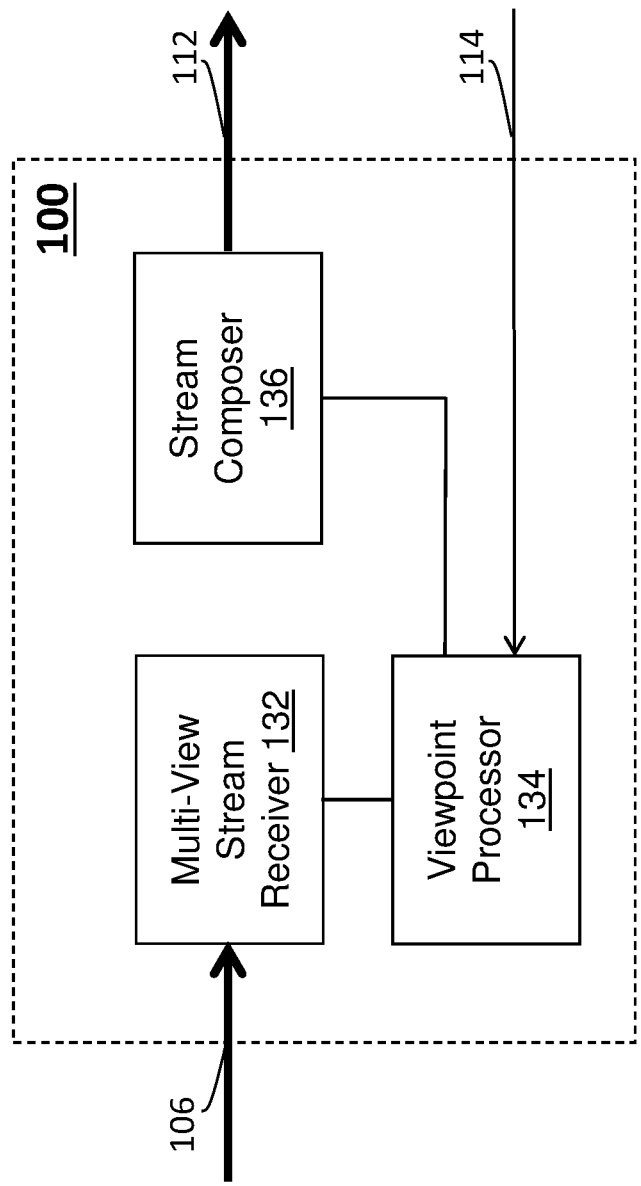
FIG. 1A and FIG. 1B illustrate example volumetric video streaming.

Example embodiments, which relate to using disocclusion atlas to support multi-view video operations, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
1. GENERAL OVERVIEW
2. VOLUMETRIC VIDEO
3. EXAMPLE VIDEO STREAMING SERVER AND CLIENT
4. IMAGE FRAGMENTS IN DISOCCLUSION DATA
5. IMAGE MASK FOR DISOCCLUSION DATA
6. DISOCCLUSION ATLAS GENERATION
7. TEMPORALLY STABLE GROUP-LEVEL LAYOUT MASKS
8. EXAMPLE PROCESS FLOWS
9. IMPLEMENTATION MECHANISMS—HARDWARE OVERVIEW
10. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

A common approach to sending volumetric video is to accompany wide-field (often 360 degree) captured or rendered images with depth from a finite set of view positions (also referred to as "recorded views," "reference views" or "represented views"). The depth value at each pixel allows these pixels to be re-projected (and z-buffered) into a putative view, which is typically in between the recorded view positions (or reference views). A single re-projected view image such as a warped image synthesized from recorded images at recorded view positions will have holes and gaps corresponding to disoccluded regions not seen from the original perspectives represented in the recorded images. By adding more surrounding source perspectives or more recorded view positions, fewer holes may be left in the re-projected view image but at the expense of a good deal of redundant data (e.g., pixels visible in each of the added multiple recorded views, etc.).

By way of comparison, techniques as described herein may be used to send a relatively small amount of disocclusion data in an atlas representation. The disocclusion data only includes texture and depth information for those fragments that are not visible from a single (nearest) reference view position, thereby avoiding redundancy in additional recorded views and significantly reducing data volumes in video streaming and decoding. These techniques can be used to lay out image fragments in a combined (e.g., rectangular, square, etc.) image, leaving as little empty space in the combined image as possible.

Further, video compression efficiency issues arising from frame-to-frame temporal variation in different consecutive atlas layouts can be effectively addressed by the techniques as described herein to enhance motion prediction (e.g., inter prediction, etc.). For example, the layouts of consecutive disocclusion atlases between atlas "I-frames" (frames that can be coded or decoded without motion prediction) can be temporally stabilized to achieve relatively high efficient compression rates.

In some operational scenarios, one or more video streams that correspond to (or comprise image data from) one or more represented views of a multi-view video can be sent to a recipient video decoder together or separately with disocclusion data for the one or more represented views. The disocclusion data comprises texture and/or depth image data for image details that may be hidden or occluded in the represented views in the video streams. Some of the occluded image details depicted by the disocclusion data may become visible in a viewer's current view (also referred to as "virtual view" or "target view") adjacent to one or more of the represented views in the video streams.

As noted, the disocclusion data can be packaged or encoded in a disocclusion atlas. The disocclusion atlas may be used by a video encoder to support encoding multi-depth information—for possibly multiple represented views—such as visible image details at one or more depths and occluded image details at other depths into a volumetric video signal comprising the video streams of the represented views. The disocclusion atlas may be used by a recipient video decoder of the video signal to render view dependent effects such as image details specific to the viewer's current view adjacent to one or more of the represented views.

The volumetric video signal can include the disocclusion atlas as a part of image metadata to assist the recipient video decoder to render images specific to the viewer's current view using image data of the represented views in the video streams. The video streams and image metadata may be encoded with a coding syntax based on a video coding standard or proprietary specification including but not limited to Moving Picture Experts Group (MPEG) video standards, H.264/Advanced Video Coding (H.264/AVC), High-Efficiency Video Coding (HEVC), MPEG-I, Dolby's ViX file format, or the like. Additionally, optionally or alternatively, the disocclusion atlas may be encoded in and decoded from a sub-stream accompanying the video streams comprising image data for the represented views.

The recipient video decoder can decode the disocclusion data packed in the disocclusion atlas in the image metadata (or sub-stream) carried by the volumetric video signal and the image data of the represented views in the video streams encoded in the volumetric video signal. The disocclusion data and the image data can be used by the video decoder to fill holes or gaps in generating or constructing images for the viewer's current view adjacent to one or more of the represented views. The viewer's current view may not coincide with any of the represented views in the video streams, the images for the viewer's current view (or view position) may be obtained from the received images of the represented views through image warping operations. Example image warping and/or synthesizing operations are described in U.S. Provisional Patent Application No. 62,518,187 filed on Jun. 12, 2017, the entire contents of which are hereby incorporated by reference as if fully set forth herein To fill the holes or gaps in the warped images, some or all of the disocclusion data in the disocclusion atlas may be accessed and retrieved, for example through efficient look-up operations or search-by-index operations, to provide image details occluded in the represented views but disoccluded in the viewer's current view. As a result, the viewer can see view-specific image details, according to the viewer's current view, that are not provided in the images of the represented views encoded in the video streams of the volumetric video signal.

Example embodiments described herein relate to streaming volumetric video. Image fragments, occluded in one or more reference images depicting a visual scene from one or more reference views and at least partly disoccluded in non-reference views adjacent to the one or more reference views, are sorted in size. The image fragments include a first image fragment that is no less in size than any other image fragment in the image fragments. A layout mask is generated for a disocclusion atlas used to store the image fragments. The layout mask is covered with a quadtree that includes a first best fit node specifically sized for the first image fragment. The sorted image fragments are stored in a descending order into best fit nodes identified in the layout mask. Each image fragment in the sorted image fragments is stored in a respective best fit node in the best fit nodes. The best fit nodes include at least one best fit node that is obtained by iteratively dividing at least one node in the quadtree that covers the layout mask. A volumetric video signal encoded with the one or more reference images is generated. The volumetric video signal is further encoded with the image fragments in the disocclusion atlas. The one or more reference images are used by a recipient device of the volumetric video signal to synthesize a display image in a non-represented view for rendering on an image display. The image fragments in the disocclusion atlas are used by the recipient device to fill disoccluded image data in disoccluded spatial regions in the display image.

Example embodiments described herein relate to rendering volumetric video. One or more reference images are decoded from a volumetric video signal. Image fragments in a disocclusion atlas are decoded from the volumetric video signal. A display image in a non-represented view is synthesized based on the one or more reference images. The image fragments in the disocclusion atlas are used to fill disoccluded image data in disoccluded spatial regions in the display image. The display image is rendered on an image display.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Volumetric Video

Techniques as described herein can be used to provide view-specific video with full parallax to a viewer responsive to the viewer's body or head motions up to all six degrees of freedom. As used herein, the term "view-specific" video (image) may mean position-specific and/or orientation-specific video (image) that is generated and/or rendered based at least in part on—or in response to a determination of—a viewer's position and/or orientation.

To achieve this, videos at a set or subset of different points in space—corresponding to a set or subset of different positions and/or different orientations that span a viewing volume in which the viewer is free to move—may be used to generate view-specific images rendered to the viewer. The videos at these different points in space may comprise texture videos as well as depth videos and form reference views (or reference viewpoints) of a volumetric video.

A virtual view such as a viewer's current view for a given position and/or orientation of the viewer—which may not be coinciding with any of these reference views—can be synthesized from these reference views represented in the volumetric video using image based rendering techniques.

As used herein, texture video refers to a sequence of texture images, over a plurality of time points, comprising a spatial distribution of pixels each specified with individual color or brightness information such as RGB pixel values, YCbCr pixel values, luma and/or chroma pixel values, or the like. Depth video corresponding the texture video refers to a sequence of depth image, over the plurality of time points, comprising a spatial distribution of pixels each specified with spatial depth information of corresponding pixels of a corresponding texture image such as z-axis values, depth values, spatial disparity values, parallax information, or the like.

A disocclusion atlas comprising disocclusion data for one or more reference views represented in one or more video streams in volumetric video can be used to support encoding multi-depth information for view dependent effects. For example, image details such as highlight speckles may appear in some but not all views and when visible may appear differently in different views (e.g., different reference views, different virtual views such as the viewer's current views at different time points, etc.). Multi-depth information of view-dependent image details that are hidden or occluded in the reference views may be included in the disocclusion data and delivered as a part of image metadata to a recipient video decoder so that view-dependent image details (or effects) can be correctly rendered or presented to a viewer in response to detected changes in the viewer's position or orientation.

Additionally, optionally or alternatively, image metadata may comprise a description of fragments, parts, patches, etc., in a disocclusion atlas as described herein. The image metadata may be delivered as a part of the volumetric video from an upstream device to a recipient device and used to help the recipient device render image data decoded from the video streams and the disocclusion atlas.

3. Example Video Streaming Server and Client

FIG. 1A illustrates an example upstream device such as a video streaming server 100 that comprises a multi-view stream receiver 132, a viewpoint processor 134, a stream composer 136, etc. Some or all of the components of the video streaming server (100) may be implemented by one or more devices, modules, units, etc., in software, hardware, a combination of software and hardware, etc.

The multi-view stream receiver (132) comprises software, hardware, a combination of software and hardware, etc., configured to receive reference texture and/or depth videos (106) for a plurality of reference views directly or indirectly from an external video source.

The viewpoint processor (134) comprises software, hardware, a combination of software and hardware, etc., configured to receive a viewer's viewpoint data from a video client device operated by the viewer in real time or near real time; establish/determine the viewer's positions or orientations for a plurality of time points over a time interval/duration of an AR, VR or volumetric video application. In the video application, display images derived from the reference texture and/or depth videos (106) are to be rendered at the plurality of time points in the viewer's viewport as provided with an image display operating in conjunction with the video client device; etc. The viewer's viewport refers to a size of a window or visible area on the image display.

The stream composer (136) comprises software, hardware, a combination of software and hardware, etc., configured to generate a (e.g., a real time, etc.) volumetric video signal 112—including but not limited to one or more video streams representing one or more reference views and disocclusion atlases containing disocclusion atlas of views adjacent to the represented views—from the reference texture and/or depth videos (106) based at least in part on viewpoint data 114 indicating the viewer's positions or orientations received as a part of input from a recipient device, etc.

The video streaming server (100) may be used to support AR applications, VR applications, 360 degree video applications, volumetric video applications, real time video applications, near-real-time video applications, non-real-time omnidirectional video applications, automobile entertainment, helmet mounted display applications, heads up display applications, games, 2D display applications, 3D display applications, multi-view display applications, etc.

Figure 1B:
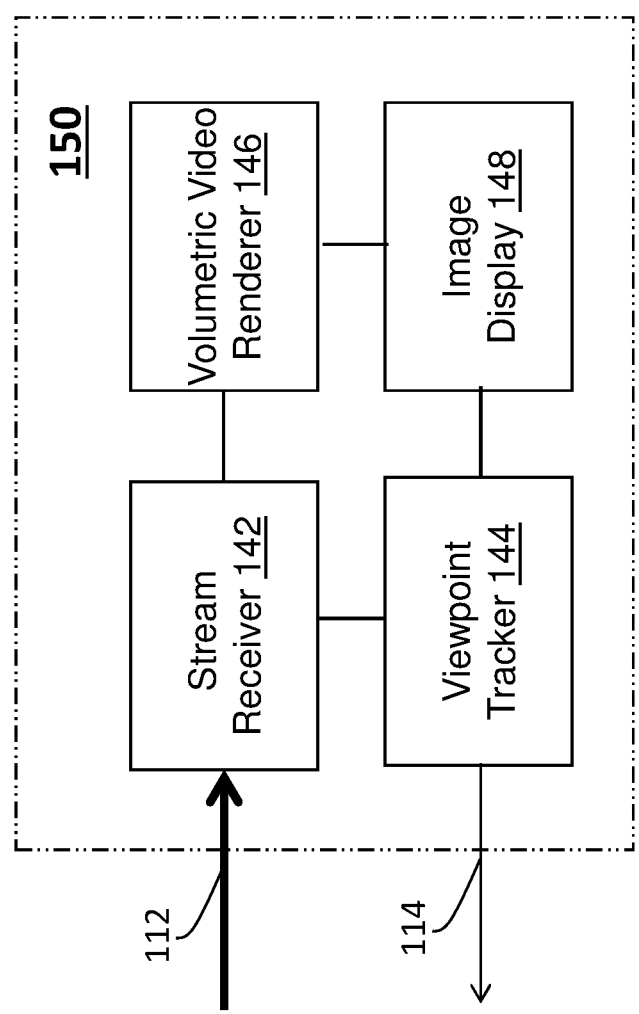

FIG. 1B illustrates an example recipient device such as a video client device 150 that comprises a real time stream receiver 142, a viewpoint tracker 144, a volumetric video renderer 146, image display 148, etc. Some or all of the components of the video client device (150) may be implemented by one or more devices, modules, units, etc., in software, hardware, a combination of software and hardware, etc.

The viewpoint tracker (144) comprises software, hardware, a combination of software and hardware, etc., configured to operate with one or more viewer position/orientation tracking sensors (e.g., motion sensors, position sensors, eye trackers, etc.) to collect real time or near real time viewpoint data 114 in connection with the viewer; send the viewpoint data (114) or the viewer's positions/orientations determined from the viewpoint data to the video streaming server (100); etc. The viewpoint data (114) may be sampled or measured at a relatively fine time scale (e.g., every millisecond, every five milliseconds, etc.). The viewpoint data can be used to establish/determine the viewer's positions or orientations at a given time resolution (e.g., every millisecond, every five milliseconds, etc.).

The real time stream receiver (142) comprises software, hardware, a combination of software and hardware, etc., configured to receive and decode the (e.g., real time, etc.) volumetric video signal (112).

The volumetric video renderer (146) comprises software, hardware, a combination of software and hardware, etc., configured to perform image warping, image warping, blending (e.g., blending multiple warped images from multiple camera sources, etc.), image composition, hole filling, etc., on image data decoded from the volumetric video (112) to generate view specific images corresponding to the viewer's predicted or measured positions or orientations; output the view specific images to the image display (148) for rendering; etc.

As used herein, video content in a video stream as described herein may include, but are not necessarily limited to, any of: audiovisual programs, movies, video programs, TV broadcasts, computer games, augmented reality (AR) content, virtual reality (VR) content, automobile entertainment content, etc. Example video decoders may include, but are not necessarily limited to, any of: display devices, a computing device with a near-eye display, a head-mounted display (HMD), a mobile device, a wearable display device, a set-top box with a display such as television, a video monitor, etc.

As used herein, a "video streaming server" may refer to one or more upstream devices that prepare and stream video content to one or more video streaming clients such as video decoders in order to render at least a portion of the video content on one or more displays. The displays on which the video content is rendered may be part of the one or more video streaming clients, or may be operating in conjunction with the one or more video streaming clients.

Example video streaming servers may include, but are not necessarily limited to, any of: cloud-based video streaming servers located remotely from video streaming client(s), local video streaming servers connected with video streaming client(s) over local wired or wireless networks, VR devices, AR devices, automobile entertainment devices, digital media devices, digital media receivers, set-top boxes, gaming machines (e.g., an Xbox), general purpose personal computers, tablets, dedicated digital media receivers such as the Apple TV or the Roku box, etc.

4. Image Fragments in Disocclusion Data

Disocclusion data in a disocclusion atlas may include image fragments that are occluded in represented (reference) views in a volumetric video signal. An image fragment as described herein refers to a contiguous, non-convex (or occluded) region of pixels with per-pixel image texture information (e.g., colors, luminance/chrominance values, RGB values, YCbCr values, etc.) and per-pixel depth information. The per-pixel image texture and depth information specified for the image fragment in the disocclusion atlas may visually depict image features/objects/structures that are hidden or occluded in the represented views of the volumetric video signal, but may become at least partly disoccluded or visible in views adjacent to the represented views.

For a given reference view that itself does not contain holes with missing image texture and depth information, synthesized images may be generated for adjacent views around the represented view using depth image based rendering (DIBR) and image texture/depth information available for the reference view. Synthesized images may have holes for which image texture information and depth information cannot be obtained from the image texture/depth information available for the reference view. With the synthesized images, an image mask can be generated to identify the holes in the synthesized images for the adjacent views.

In some operational scenarios, the image mask can be at least partly generated for the given reference view by identifying image regions (or areas) in the given reference view that contain large gaps in depth between or among adjacent pixels from other image regions in the given reference view that have relatively smooth transitions in depth between or among adjacent pixels.

Image texture information and depth information for image fragments in the holes (or non-convex regions of pixels)—as identified in the image mask—may be obtained from spatially different reference views or from temporally different reference views. For instance, spatially different reference views that are for the same time point as the given reference view but are spatially different from the given reference view may contain and provide image texture and depth information for the holes in the synthesized images in the adjacent views. These spatially different reference views including the given reference view may collectively form a multi-view image for the same time point.

Additionally, optionally or alternatively, temporally different reference views that are for different time points from that of the given reference view may contain and provide image texture and depth information for the holes in the synthesized images in the adjacent views. These temporally different reference views including the given reference view may belong to the same visual scene, the same group of pictures (GOP), etc.

Additionally, optionally or alternatively, artificial intelligence (AI) or machine learning (ML) may be trained by training images and then applied to generate or predict some or all of the image texture and depth information for the holes in the synthesized images in the adjacent views.

Image fragments included in the disocclusion atlas for a given time point may be partitioned into different subsets of image fragments for different reference views. Each subset of image fragments in the different subsets may comprise (occluded) image fragments in a respective reference views of the different reference views.

Disocclusion atlas techniques as described herein can be used to (e.g., adaptively, optimally, etc.) pack these image fragments into a combined image (or "atlas") covering a minimal total area and having no overlapping fragments. Each fragment in the combined image representing a disocclusion atlas has a dedicate region (or area) without being overlapped by other fragments included in the disocclusion atlas.

A volumetric video signal may be generated from a sequence of consecutive multi-view images. The sequence of consecutive multi-view images comprises a plurality of multi-view images for a plurality of time points forming a sequence of consecutive time points. Each multi-view image in the plurality of multi-view images comprises a plurality of single-view images for a plurality of reference views for a respective time point in the plurality of time points.

A sequence of consecutive disocclusion atlases may be generated for the sequence of consecutive time points. The sequence of consecutive disocclusion atlases comprises a plurality of disocclusion atlases for the plurality of time points in the sequence of consecutive time points. Each disocclusion atlas in the plurality of disocclusion atlases comprises image fragments including one or more subsets of image fragments for one or more reference views, in the plurality of reference views, that are represented in the volumetric video signal for a respective time point in the plurality of time points.

For a sub-interval (e.g., a fraction of second, one or more seconds, etc.) in a time interval (e.g., 30 minutes, one or more hours, etc.) covered by the sequence of consecutive time points, the volumetric video signal may be encoded with one or more subsequences of groups of pictures (GOPs) for the one or more reference views represented in the signal. Each subsequence of GOPs in the one or more subsequence of GOPs comprises a subsequence of texture images and a subsequence of depth images for a respective reference view in the one or more reference views represented in the volumetric video signal.

Each subsequence of GOPs includes one or more GOPs. Each GOP is delimited by I-frames, or begins with a starting I-frame and ends with a frame right before the next starting I-frame. In some embodiments, the starting I-frame and the next starting I-frame may be two nearest I-frames with no other I-frame(s) in between. In some embodiments, the starting I-frame and the next starting I-frame may be nearby I-frames but not necessarily two nearest I-frames. An I-frame in a GOP may be decoded without relying on image data from other frames, whereas a non-I-frames such as B-frames or P-frames in the GOP may be predicted at least in part from other frames in the GOP. I-frame(s) and/or non-I-frame(s) in the GOP may be generated from temporally stable or temporally similar source/input images. These temporally stable source/input images can facilitate relatively efficient inter or intra prediction and data compression or encoding in generating the I-frame(s) and/or non-I-frame(s) in the GOP.

For the same sub-interval in the interval covered by the sequence of consecutive time points, the volumetric video signal may be encoded with one or more subsequences of groups of disocclusion atlases for the one or more reference views represented in the signal. Each subsequence of groups of disocclusion atlases in the one or more subsequence of groups of disocclusion atlases comprises a subsequence of texture images and a subsequence of depth images for holes in adjacent views to a respective reference view in the one or more reference views represented in the volumetric video signal.

Each subsequence of groups of disocclusion atlases includes one or more groups of disocclusion atlases. Each group of disocclusion atlas is delimited by atlas I-frames, or begins with a starting atlas I-frame and ends with an atlas frame right before the next starting atlas I-frame. In some embodiments, the starting atlas I-frame and the next starting atlas I-frame may be two nearest atlas I-frames with no other atlas I-frame(s) in between. In some embodiments, the starting atlas I-frame and the next starting atlas I-frame may be nearby atlas I-frames but not necessarily two nearest atlas I-frames. An atlas I-frame in a group of disocclusion atlases may be decoded without relying on disocclusion data from other atlas frames, whereas an atlas non-I-frames such as atlas B-frames or atlas P-frames in the group of disocclusion atlases may be predicted at least in part from other atlas frames in the group of disocclusion atlases. Atlas I-frame(s) and/or atlas non-I-frame(s) in the group of disocclusion atlases may be generated from temporally stable or temporally similar disocclusion atlases. These temporally stable disocclusion atlases can facilitate relatively efficient inter or intra prediction and data compression or encoding in generating the atlas I-frame(s) and/or atlas non-I-frame(s) in the group of disocclusion atlases.

5. Image Mask for Disocclusion Data

Figure 2A:
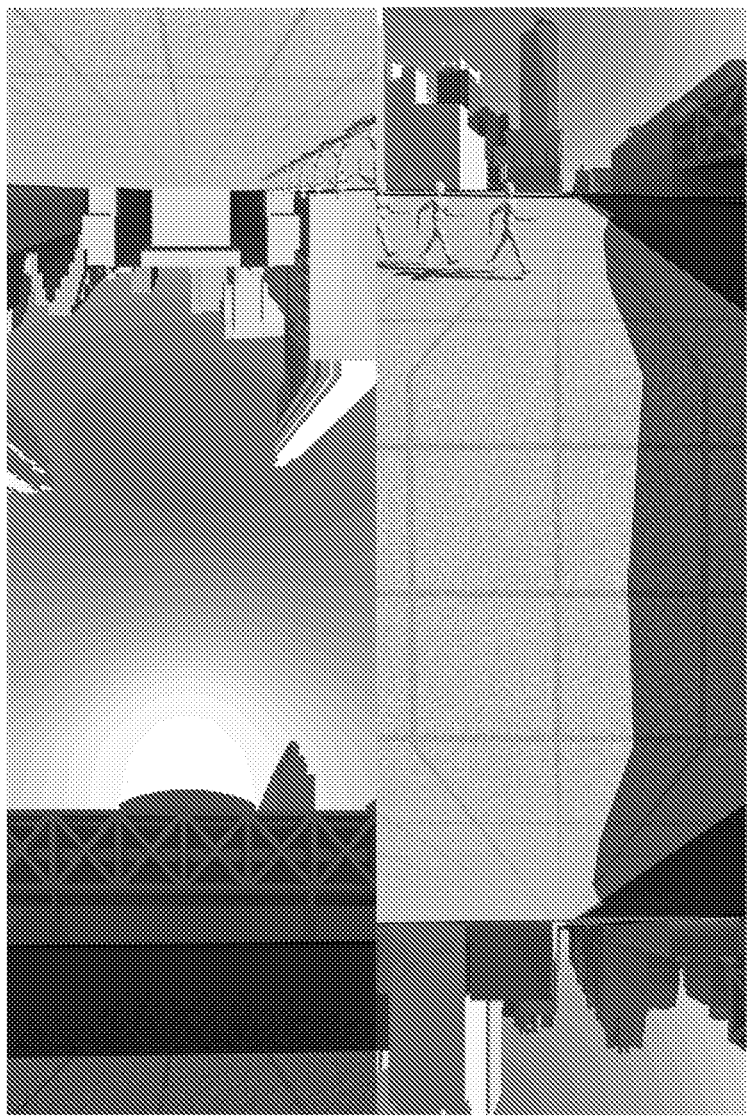
FIG. 2A and FIG. 2B illustrate example texture and depth images.

FIG. 2A illustrates an example texture image (e.g., a 360 degree "baseball cover" view, etc.) in a reference view. The texture image comprises texture information such as colors, luminance/chrominance values, RGB values, YCbCr values, etc., for an array of pixels in an image frame. The texture image may correspond to, or may be indexed by, a time point in the time interval covered by the sequence of consecutive time points, and may be encoded into a video stream for the reference view, for example as a texture image I-frame or texture image non-I-frame in a textual image group of pictures or images (GOP) in the video stream.

Figure 2B:
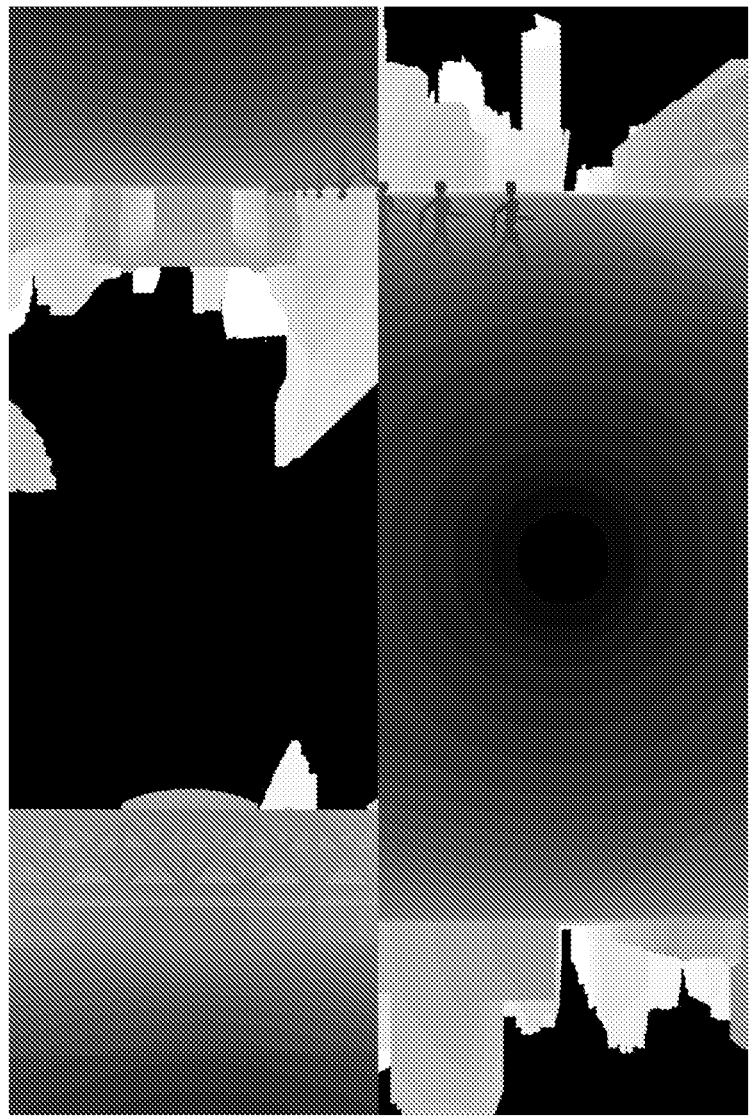

FIG. 2B illustrates an example depth image (e.g., a 360 degree "baseball cover" view, etc.) in the same reference view as the texture image of FIG. 2A. The depth image of FIG. 2B comprises depth information such as depth values, z-values, spatial disparity values, parallax values, etc., for some or all pixels in the array of pixels in the texture image of FIG. 2A. The depth image may correspond to, or may be indexed by, the same time point in the time interval covered by the sequence of consecutive time points, and may be encoded into the video stream for the reference view, for example as a depth image I-frame or depth image non-I-frame in a depth image group of pictures or images (GOP) in the video stream.

Figure 2C:
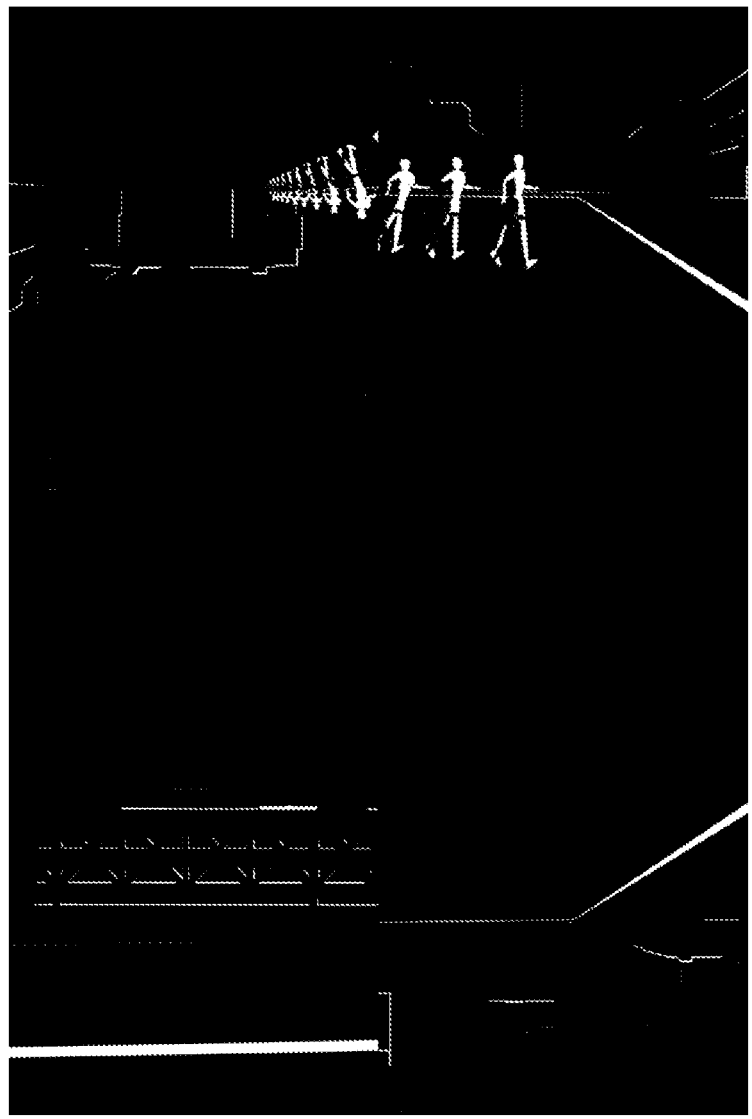
FIG. 2C illustrates an example image mask for identifying spatial regions that are occluded in reference views and become at least partly disoccluded in adjacent views.

FIG. 2C illustrates an example image mask, which may be a bit mask having an array of bits. Indicators or bits in the array of bits in the image mask may (e.g., 1-1, etc.) correspond to respective pixels in the array of pixels represented in the texture image of FIG. 2A and/or the depth image of FIG. 2B. Each indicator or bit in the image mask may indicate or specify whether a disocclusion data portion such as a disoccluded pixel texture value (e.g., colors, luminance/chrominance values, RGB values, YCbCr values, etc.) and/or a disoccluded pixel depth value (e.g., depth values, z-values, spatial disparity values, parallax values, etc.) is provided in a disocclusion atlas to be used with the texture image of FIG. 2A and/or the depth image of FIG. 2B in image warping and hole filling operations.

Example hole filling operations are described in U.S. Provisional Patent Application No. 62/811,956, "HOLE FILLING FOR DEPTH IMAGE BASED RENDERING," filed on Apr. 1, 2019, by Wenhui Jia et al., the entire contents of which are hereby incorporated by reference as if fully set forth herein.

The image warping and hole filling operations may be used to generate a synthesized image for a viewer's current view, which may be an adjacent view to the reference view. Disoccluded pixel texture values and/or disoccluded pixel depth values as provided in the disocclusion atlas depicts image details that are occluded in the texture image of FIG. 2A and/or the depth image of FIG. 2B, but may become partly visible in adjacent views to the reference view. The disocclusion atlas may correspond to, or may be indexed by, the same time point in the time interval covered by the sequence of consecutive time points, and may be encoded into the video stream or a separate attendant video stream for the reference view, for example as an atlas I-frame or an atlas non-I-frame in a group of disocclusion atlases in the video stream or the separate attendant video stream.

The image mask as illustrated in FIG. 2C does not appear to align with the corresponding texture image of FIG. 2A or the corresponding depth image of FIG. 2B, as the mask covers those parts of the texture image and/or the depth image that are not visible from one or more adjacent views neighboring the reference view. The purpose of the disocclusion atlas generated with the image mask is to provide texture and depth image data to fill holes in a synthesized view such as the viewer's current view, where the holes are created due to disocclusions in the reprojection of the synthesized view (or chosen "reference" view). In various operational scenarios, texture and depth data in the disocclusion atlas may cover spatial regions more or less than, or the same as, the holes in the synthesized view.

In some operational scenarios, the spatial regions covered by the disocclusion atlas may include safety margin so that the disocclusion atlas can ensure disoccluded texture and depth data in the disocclusion atlas are available to completely fill the holes in the adjacent views to the reference view.

In some operational scenarios, the spatial regions covered by the disocclusion may not include safety margin so that the disocclusion atlas may not ensure disoccluded texture and depth data in the disocclusion atlas are available to completely fill the holes in the adjacent views to the reference view. In these operational scenarios, a recipient video decoder may apply hole filling algorithm to generate at least a part of texture and depth information for a part of the holes in the synthesized view adjacent to or neighboring the reference view represented in the video stream.

Additionally, optionally or alternatively, masked spatial regions covered in the disocclusion atlas may be used to select salient visual objects from a visual scene depicted in the reference view. For example, the disocclusion atlas may not carry or provide a recipient video decoder any texture or depth information to cover spatial regions away from the salient visual objects. Spatial regions for which the disocclusion atlas carries or provides a recipient video decoder texture or depth information may indicate to the recipient video decoder the spatial regions contain the salient visual objects.

6. Disocclusion Atlas Generation

Figure 3A:
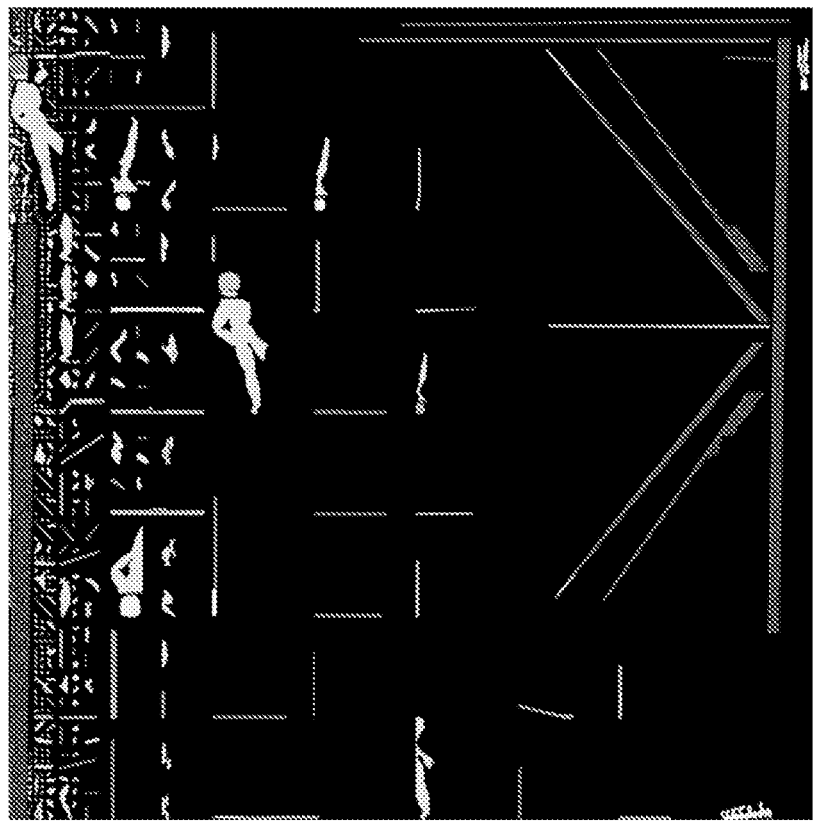
FIG. 3A illustrates an example disocclusion atlas.

FIG. 3A illustrates an example (output) disocclusion atlas that include, or is packaged with, image fragments representing occluded regions for one or more reference views. Image metadata may be generated to indicate to which reference views these image fragments in the disocclusion atlas respectively correspond.

By way of example, a volumetric video signal is generated from a sequence of multi-view images. Each multi-view image in the sequence of multi-view images may comprise a collection of N single-view (input/source) texture images for N reference views and a collection of N single-view (input/source) depth images for the N reference views for a time point in a sequence of consecutive time points.

View parameters may be received and used to specify or define an injective function that maps image (pixel) coordinates (e.g., pixel positions, rows and columns of pixels, etc.) and depth to a coordinate system such as the World (3-D) coordinate system. The view parameters may be used to synthesize images in adjacent views, identify holes or regions that may be occluded in the reference views but may become at least partly disoccluded in the adjacent views, determine, estimate or predict disocclusion texture data and disocclusion depth data for these holes or regions on a per-reference-view basis for some or all of the reference views.

For each single-view texture image and single-view depth image for a reference view and for a given time point, an image mask such as a bit mask may be generated for the reference view, identifying spatial regions for which disocclusion texture and depth data is to be provided in a disocclusion atlas for the given time point, such as illustrated in FIG. 3A.

Figure 3B:
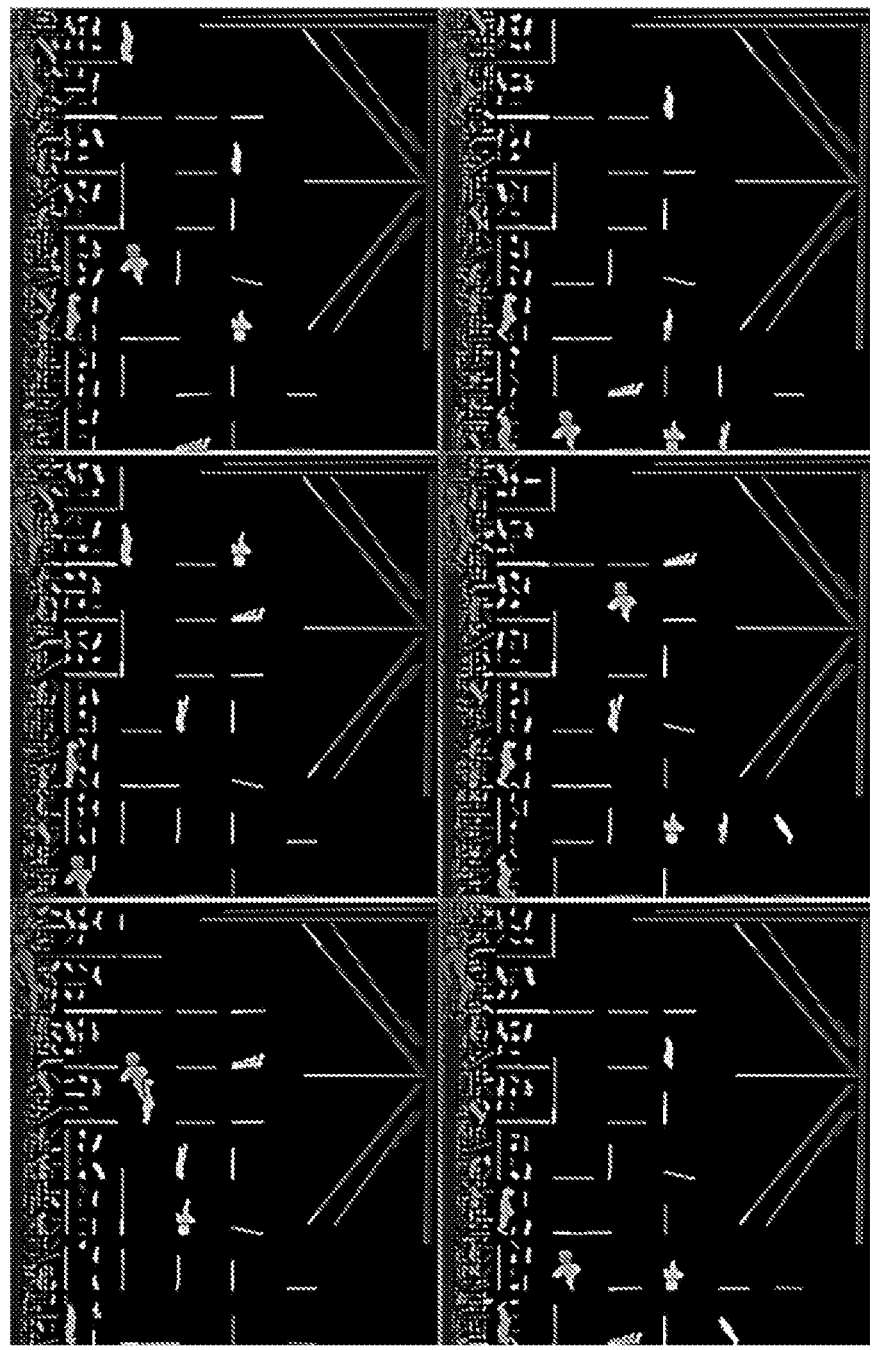
FIG. 3B illustrates an example sequence of consecutive disocclusion atlases.

FIG. 3B illustrates an example sequence of consecutive disocclusion atlases that may be created for the sequence of multi-view images in a received or input multi-view video. The sequence of disocclusion atlas may be encoded into groups of disocclusion atlases. Each such group of disocclusion atlases comprises temporally stable disocclusion atlases and can be relatively efficiently encoded into a video stream.

Figure 4A:
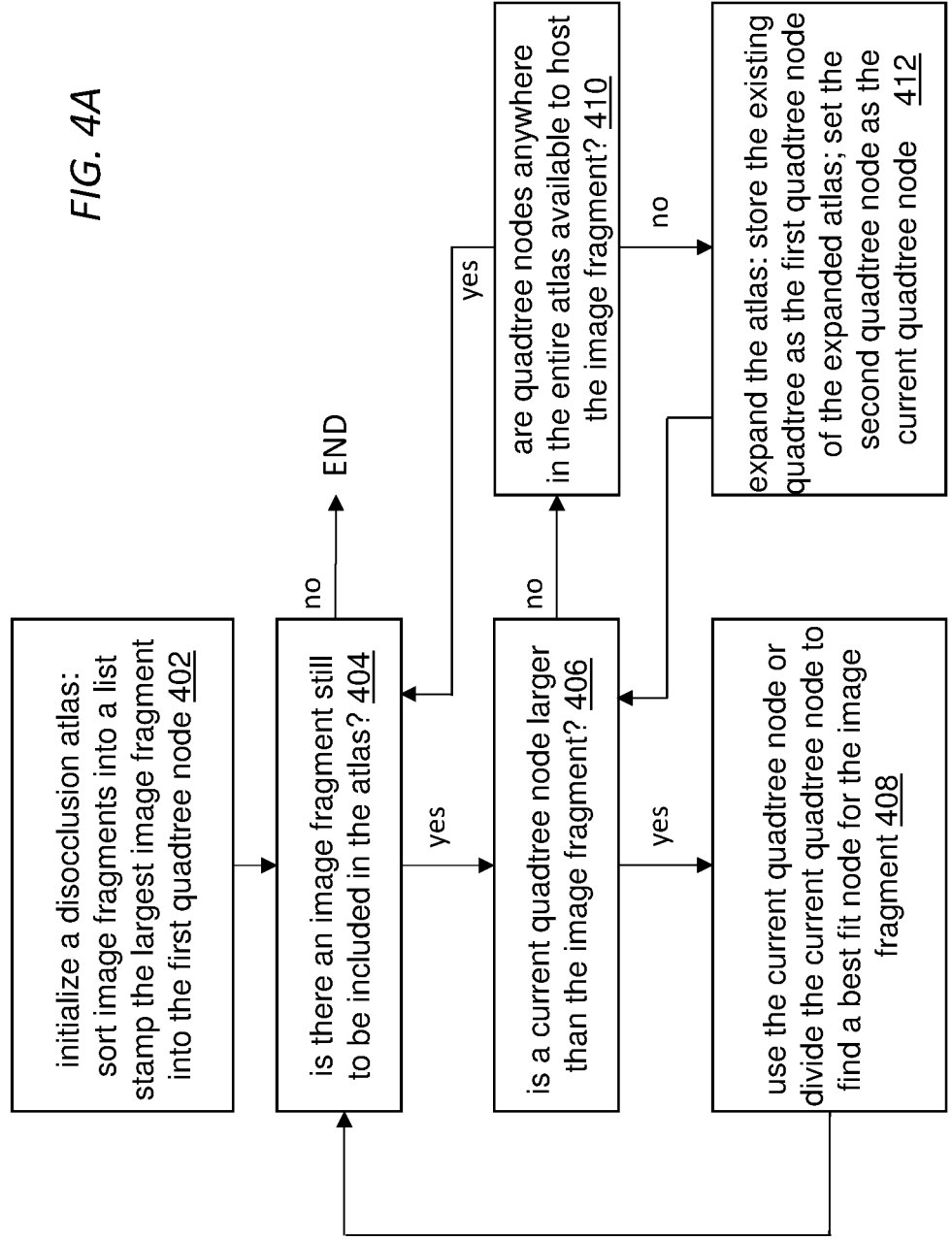

FIG. 4A illustrates an example processing flow for generating a disocclusion atlas such as illustrated in FIG. 3A for a multi-view image in a sequence of multi-view images covering a time interval. In some example embodiments, one or more computing devices or components may perform this process flow.

The multi-view image corresponds to or is indexed to a time point in the time interval and comprises N (source/input) single-view texture images for N reference views and N (source/input) single-view depth images for the N reference views. Each single-view texture image in the N single-view texture images corresponds to a respective single-view depth image in the N single-view depth images.

In block 402, a system as described herein (e.g., 100 of FIG. 1A, etc.) performs initialization operations with respect to the disocclusion atlas, before the disocclusion atlas is used to store (e.g., copy, stamp, place, etc.) image fragments for spatial regions or holes that may exist in synthesized/warped images in adjacent views to the N reference views.

The initialization operations of block 402 may include: (a) receiving or loading N image masks identifying the spatial regions or holes in the N reference views that may have missing texture or depth data in the synthesized/warped images in the adjacent views to the N reference views; (b) receiving or loading texture and depth information for the image fragments identified in the N image masks; (c) sorting the image fragments by size into a list of image fragments; etc.

Here, "size" refers to a metric to measure spatial dimensions of the image fragments. A variety of metrics may be used to measure spatial dimensions of the image fragments. For example, a minimum rectangle that completely encloses an image fragment may be determined. A horizontal size (denoted as "xsize"), a vertical size (denoted as "ysize"), a combination of the horizontal size and the vertical size, etc., may be used individually or collectively as metric(s) to measure the size of the image fragment.

In some operational scenarios, a size of an image fragment may be computed as: 64*max(xsize, ysize)+min(xsize, ysize), where each of xsize and ysize may be represented in units of pixels—or in units of a horizontal or vertical dimension (which may be a non-negative integer power of 2) of specific sized pixel blocks such as 2 pixels in 2×2 pixel blocks, 4 pixels in 4×4 pixel blocks, etc.

Each image mask in the N loaded image masks correspond to a respective reference view in the N reference views. The image mask comprises image mask portions for image fragments that are occluded in the reference view but become at least partly visible in adjacent views to the reference view. Each image mask portion in the image mask portions in the image mask spatially delineates or defines a respective image fragment in the image fragments that are occluded in the reference view to which the image mask corresponds but become at least partly visible in adjacent views to the reference view. For each pixel represented in in the image mask, a bit indicator is set to true or 1 if the pixel belongs to one of the image fragments, and otherwise set to false or 0 if the pixel belong to none of the image fragments.

In some operational scenarios, the disocclusion atlas includes a layout mask used to set forth a spatial arrangement of (e.g., all, etc.) the image fragments for the multi-view image and identify or track image fragments for which disocclusion data is stored or maintained in the disocclusion atlas. The layout mask may comprise an array of pixels arranged within a spatial shape such as a rectangular shape. The image fragments spatially delineated or defined in the layout mask of the disocclusion atlas are mutually exclusive and (e.g., completely, etc.) non-overlapping with one another in the layout mask.

The initialization operations of block 402 may further include: (d) creating a singular quadtree root node. This root node is to be initialized to a best size to just cover the size of the largest image fragment. The quadtree is incrementally grown by a factor of two in each dimension as needed in order to keep a corresponding layout mask as small as possible; (e) linking the largest image fragment to the first node of the quadtree by stamping (e.g., an image mask portion for, etc.) the image fragment into a designated region, for the first node, in the layout mask of the disocclusion atlas; etc. The first node of the quadtree here refers to the first quadtree node among the first level quadtree nodes under the root node representing the entire layout mask. Here, "stamping" refers to copying, transferring, or fitting an image fragment or an image mask portion therefor in the layout mask of the disocclusion atlas. Here "quadtree" refers to a tree data structure in which each internal node has four children quadtree nodes.

The quadtree initially comprises four nodes of equal sized spatial shapes such as equal sized rectangles. A spatial shape of a node of a quadtree as described herein may have a special dimension having a count of pixels that is a non-negative integer power of 2.

Subsequent to stamping the largest image fragment into the layout mask of the disocclusion atlas, the largest image fragment is removed from the list of (size sorted) image fragments, and the next quadtree node after the first quadtree node is set as the current quadtree node. The current quadtree node represents an empty or candidate quadtree node (not yet populated by any image fragment or respective image mask portion) to be used next to host an image fragment.

In block 404, the system determines whether the list of the size sorted image fragments contains any image fragment still needed to be stamped or spatially arranged into the layout mask of the disocclusion atlas. In some embodiments, any image fragments below a minimum fragment size threshold may be removed from the list or may be ignored in the list. Example minimum fragment size threshold may be one of: four (4) pixels on one or both of horizontal and vertical dimensions, six (6) pixels on one or both of horizontal and vertical dimensions, and so forth.

In response to determining that the list of (size sorted) image fragments does not contain image fragment(s) still needed to be stamped or spatially arranged into the layout mask of the disocclusion atlas, the processing flow ends.

Otherwise, in response to determining that the list of (size sorted) image fragments contains image fragment(s) still needed to be stamped or spatially arranged into the layout mask of the disocclusion atlas, the system selects the next largest image fragment as the current image fragment from the list of (size sorted) image fragments.

In block 406, the system determines whether the current quadtree node in the quadtree is sufficiently large to host the current image fragment—or a corresponding image mask portion for the current image fragment.

In response to determining that the current quadtree node in the quadtree is not sufficiently large to host the current image fragment, the processing flow goes to block 410.

Otherwise, in response to determining that the current quadtree node in the quadtree is sufficiently large to host the current image fragment, the processing flow goes to block 408.

In block 408, the system determines whether the current quadtree node is a "best" fit quadtree node for the current image fragment. The "best" fit quadtree node refers to a quadtree node that is just large enough to host the image fragment or the image mask portion therefor. In other words, the best" fit quadtree node represents a quadtree node of a minimum size to completely enclose or host the image fragment in the layout mask of the disocclusion atlas.

In response to determining that the current quadtree node is not a "best" fit quadtree node for the current image fragment, the system subdivides (e.g., repeatedly, iteratively, recursively, etc.) the current quadtree node until a "best" fit quadtree node is found. The "best" fit quadtree node is set to be the current quadtree node.

Once it is determined that the current quadtree node is a "best" fit quadtree node for the current image fragment, the system stamps or spatially delineates the current image fragment in the "best" fit quadtree node.

Subsequent to stamping the current image fragment into the layout mask of the disocclusion atlas or the current quadtree node, the current image fragment is removed from the list of (size sorted) image fragments, and the next quadtree node after the (removed) current quadtree node is set as the (new or present) current quadtree node.

In block 410, the system determines whether there are empty or candidate quadtree nodes anywhere under the root node representing the entire layout mask of the disocclusion atlas available to host the current image fragment. If so, the empty or candidate quadtree nodes are used (e.g., collectively if more than one node is used, etc.) to host the current image fragment. The process flow then goes to block 404. Thus, if the current image fragment does not fit (in its entirety) into any existing (child) quadtree node under the current quadtree node, then an attempt can be made to fit the fragment anywhere in the layout mask. It should be noted that, in many operational scenarios, quadtree(s) are merely acceleration data structures designed to make atlas construction faster. A quadtree as described herein may not be saved or needed once the layout (or layout mask) is determined. Further, there are no (e.g., absolute, inherent, etc.) restrictions imposed by a quadtree as described herein on where any image fragments may be placed. An image fragment can—and often do in some operational scenarios—overlap multiple quadtree nodes. Thus, if the "best fit" method (e.g., to find a single best fit node for a fragment such as the current image fragment, etc.) fails, a more exhaustive (and expensive) search can be performed over the entire layout mask to fit the fragment at hand. On success, all quadtree nodes that the thus-placed fragment overlaps are marked as "occupied", and processing continues. On failure, the processing flow goes to block 412 to grow the quadtree. The reason the overall algorithm as illustrated in FIG. 4A is still efficient and effective is because, most of the time in many operational scenarios, the best fit quadtree search succeeds. It is only when a best fit node is not found for the current image fragment, a more expensive or exhaustive fallback search is conducted or invoked to find possibly overlapping quadtree nodes to host the current image fragment. This may involve searching (e.g., in a search loop over, etc.) up to all empty or candidate quadtree nodes (not yet occupied by any image fragment) in the entire layout mask of the disocclusion atlas.

In response to determining that none of the empty or candidate quadtree node remaining in the layout mask is sufficiently large to host the current image fragment, the processing flow goes to block 412.

Otherwise, in response to determining that an empty or candidate quadtree node in the layout mask is sufficiently large to host the current image fragment, the empty or candidate quadtree node is set as the (new) current quadtree node and the processing flow goes to block 408.

In block 412, the system expands or increases the size of the disocclusion atlas or the layout mask of the disocclusion atlas by two times (2×) in each of the horizontal and vertical dimensions. The existing quadtree (or the old quadtree) before this expansion may be linked or placed into the first quadtree node (e.g., the upper-left quadrant of the newly expanded quadtree, etc.). The second quadtree node (e.g., the upper-right quadrant of the newly expanded quadtree, etc.) is set to be the (new) current quadtree node. The processing flow goes to block 408.

Texture and depth values for each pixel as identified in the layout mask of the disocclusion atlas as belonging to an image fragment may be stored, cached, or buffered as a part of the disocclusion atlas along with the layout mask of the disocclusion atlas.

7. Temporally Stable Group-Level Layout Masks

To stabilize consecutive disocclusion atlases in a video sequence, layout masks of disocclusion atlases in a group of consecutive disocclusion atlases—which may correspond to a texture image GOP, a depth image GOP, etc., in the video sequence—for a plurality of consecutive time points may be disjunctively joined by an "or" operation to form a group-level layout mask for the group of consecutive disocclusion atlases.

Each layout mask in the layout masks may be of an equal size and compresses the same array of pixels with respective indicators or bits to indicate whether any pixel in the layout mask belongs to an image fragment hosted in a respective disocclusion atlas.

The group-level layout mask may be of the same size as the (individual) layout masks for the group of consecutive disocclusion atlases and comprises the same arrays of pixels as in the (individual) layout masks. To generate the group-level layout mask through a union operation or the disjunctive "or" operation, an indicator or a bit for a pixel at a specific pixel location or index may be set to true or one (1) if any of indicators or bits for corresponding pixels at the same specific pixel location or index in the (individual) layout masks for the group of consecutive disocclusion atlases is true or one (1).

Figure 3C:
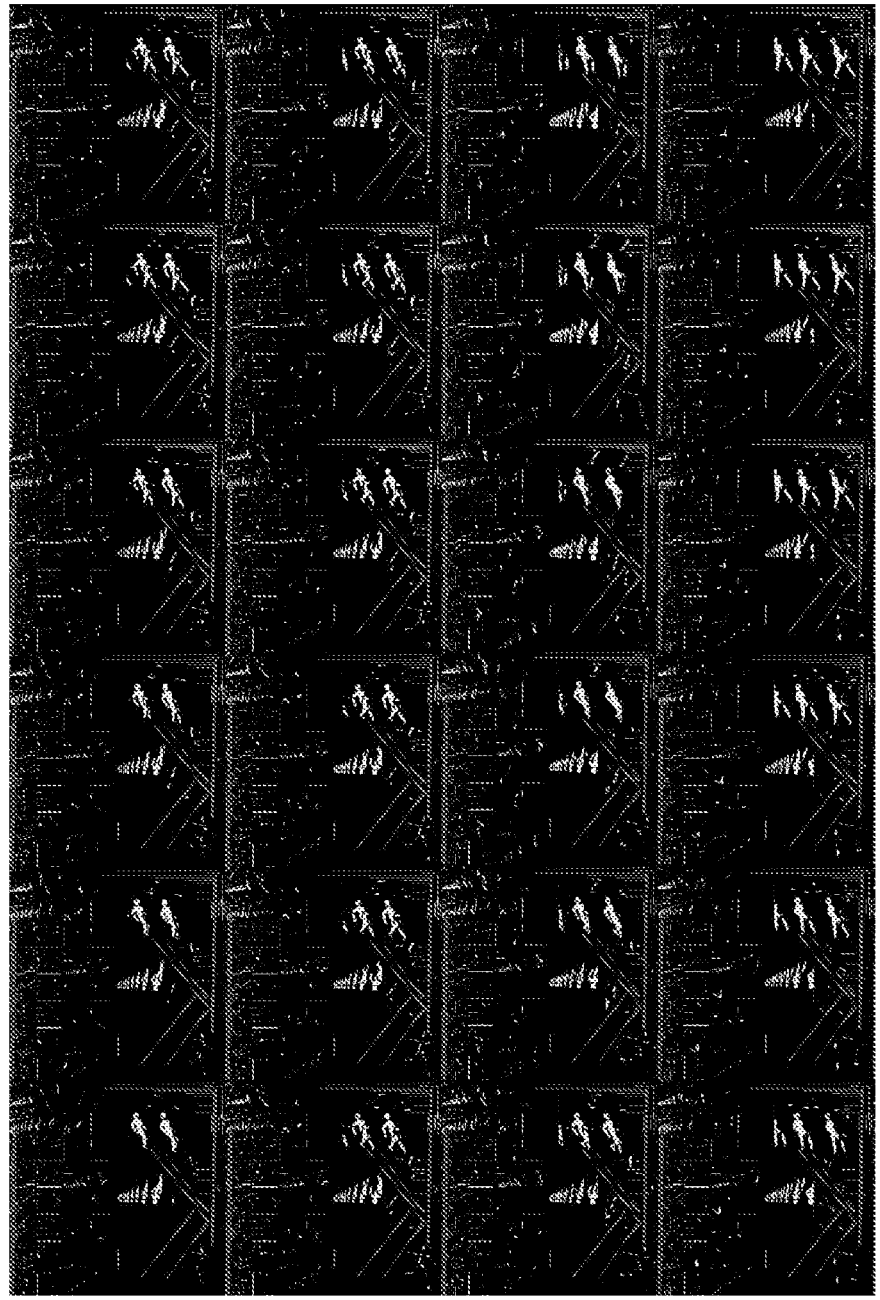
FIG. 3C illustrates an example group of consecutive disocclusion atlases generated with a common group-level layout mask.

The group-level layout mask or instances thereof may be repeatedly used for each disocclusion atlas in the group of consecutive disocclusion atlases to host or layout image fragments to be represented in the disocclusion atlas for a respective time point the plurality of consecutive time points covered in the group of consecutive disocclusion atlases. Pixels that do not have disocclusion texture and depth information for a time point may be left off (e.g., undefined, unoccupied, etc.) in a corresponding instance of the group-level layout mask for the time point (or the timestamp). FIG. 3C illustrates an example group of consecutive disocclusion atlases generated with a common group-level layout mask as described herein.

In some operational scenarios, separate disocclusion atlases may be generated using multiple instances of the same group-level layout mask. The very first disocclusion atlas in the group of consecutive disocclusion atlases—along with the very first instance of the combined group-level layout mask—may be used to generate a starting atlas I-frame, following by other atlas frames generated from other disocclusion atlases in the group of consecutive disocclusion atlases. The starting atlas I-frame and the other atlas frames may form a group of consecutive atlas frames delimited by the starting atlas I-frame and the next starting atlas I-frame before the end of the group. The group-level layout mask, which is temporally stable, can be used to facilitate data compression operations such as applying inter prediction and/or intra prediction to find data similarity and to reducing overall data in the group of consecutive disocclusion atlases to be transmitted to a recipient video decoder. In some implementation examples, using union of layout masks (or bit masks) over an (I-frame) time interval can improve video compression by 2× or better.

In some operational scenarios, texture and depth data for all pixels as identified in each of the individual layout masks for consecutive disocclusion atlases may be included or transmitted without generating the combined group-level layout mask for the consecutive disocclusion atlases. Data compression operations—using the individual layout masks that are temporally and spatially different from one another—may not be as efficient in reducing data volumes as data compression operations using a group-level layout mask as described herein.

In some operational scenarios, to lay out image fragments onto a layout mask of a disocclusion atlas, these image fragments may be fit into available spatial regions such as empty or candidate quadtree nodes without being first rotated. In some operational scenarios, to increase packing efficiency, an image fragment may be first rotated before placing into a "best" fit quadtree node. As a result, a quadtree node that may not be able to host the image fragment before the rotation may be able to host the image fragment after the rotation.

A multi-view image or any single-view image therein may be a 360 degree image. Image data (including disocclusion data) for the 360 degree image may be represented in an image frame such as a rectangular frame (e.g., in a "baseball cover" view, etc.). As illustrated in FIG. 2A and FIG. 2B, such an image may comprise multiple image segments combined together into a rectangular image frame, for example in a "baseball cover" view. However, the multiple image segments may be combined together into a different view's shape, for example a square view's shape.

A disocclusion atlas as described herein may include or set forth mask striping in a layout mask to indicate that an image fragment comprises texture and depth information bordering a boundary of an image segment. The reason for placing the mask striping in the layout mask is to avoid the case where an atlas hosted image fragment crosses over a C° (or the zero-th order) discontinuity corresponding to a seam in a 360 degree image, which may comprise multiple image segments joined with one or more seams. For example, in the baseball cover representation of a 360 degree image, there is one long horizontal seam down the middle, where the neighboring pixels on the different sides of the seam do not correspond to neighboring portions of the (e.g., actual, etc.) view of a visual scene. Mask striping may be implemented in disocclusion atlas(es) through zeroing out a line in input masks along this seam to guarantee that image fragments will not cross this border. Thus, the image fragments with the mask striping may be constrained and correctly interpreted to be applied to fill holes or gaps on the same side of the line as that of the image fragments.

8. Example Process Flows

FIG. 4B illustrates an example process flow according to an example embodiment of the present invention. In some example embodiments, one or more computing devices or components may perform this process flow. In block 422, an upstream device sorts, in size, image fragments that are occluded in one or more reference images depicting a visual scene from one or more reference views and that become at least partly disoccluded in non-reference views adjacent to the one or more reference views. The image fragments include a first image fragment that is no less in size than any other image fragment in the image fragments.

In block 424, the upstream device generates a layout mask for a disocclusion atlas used to store the image fragments. The layout mask is covered with a quadtree that includes a first best fit node specifically sized for the first image fragment. The first fit node is sized for (e.g. completely) covering the first image segment.

In block 426, the upstream device stores the sorted image fragments in a descending order into best fit nodes identified in the layout mask. Each image fragment in the sorted image fragments is stored in a respective best fit node in the best fit nodes. The best fit nodes include at least one best fit node that is obtained by iteratively dividing at least one node in the quadtree that covers the layout mask. Each of the best fit nodes may be identified as a quadtree node of a minimum size for completely covering each of the respective image fragments In block 428, the upstream device generates a volumetric video signal encoded with the one or more reference images. The volumetric video signal is further encoded with the image fragments in the disocclusion atlas. The one or more reference images are used by a recipient device of the volumetric video signal to synthesize a display image in a non-represented view for rendering on an image display. The image fragments in the disocclusion atlas are used by the recipient device to fill disoccluded image data in disoccluded spatial regions in the display image.

In an embodiment, each of the one or more reference images represents one of: a 360 degree image, a 180 degree image, a viewport image, an image in a regular spatial shape image frame, or an image in an irregular spatial shape image frame.

In an embodiment, each of the image fragments includes, for a spatial region formed by contiguous pixels occluded in the one or more reference views, texture image values and depth image values.

In an embodiment, the set of one or more saliency video streams includes a first saliency video stream assigned with a first saliency rank and a second saliency video stream assigned with a second saliency rank lower than the first saliency rank; the second video stream is removed from the set of one or more saliency video streams to be transmitted to the video streaming client at a later time, in response to determining that an available data rate has been reduced.

In an embodiment, the one or more reference images are included in a multi-view image in a multi-view image group comprising a plurality of consecutive multi-view images for a plurality of consecutive time points; the disocclusion atlas is included in a disocclusion atlas group comprising a plurality of disocclusion atlases for the plurality of consecutive time points.

In an embodiment, the layout mask is included in a plurality of individual layout masks generated for the plurality of disocclusion atlases; a group-level layout mask is generated from the plurality of individual layout masks through union operations; the disocclusion atlas encoded in the volumetric video signal is represented in the group-level layout mask.

In an embodiment, the disocclusion atlas group is encoded in the volumetric video signal as a group of atlas frames; wherein the group of atlas frames starts with an atlas I-frame and ends before a different atlas I-frame.

In an embodiment, the disocclusion atlas includes mask striping; the mask striping indicates that an image fragment stored in the disocclusion atlas borders at one or more boundaries of image segments.

In an embodiment, the layout mask is expanded in response to determining that a best fit node is not found within a pre-expanded size of the layout mask.

In an embodiment, spatial regions for the image fragments are identified in a bit mask; the image fragments are sorted using sizes of the spatial regions for the image fragments.

In an embodiment, the image fragments stored in the disocclusion atlas are located in one or more saliency regions identified from the visual scene. Saliency regions may be more interesting or more important portions or regions of interest of the visual scene.

Figure 4C:
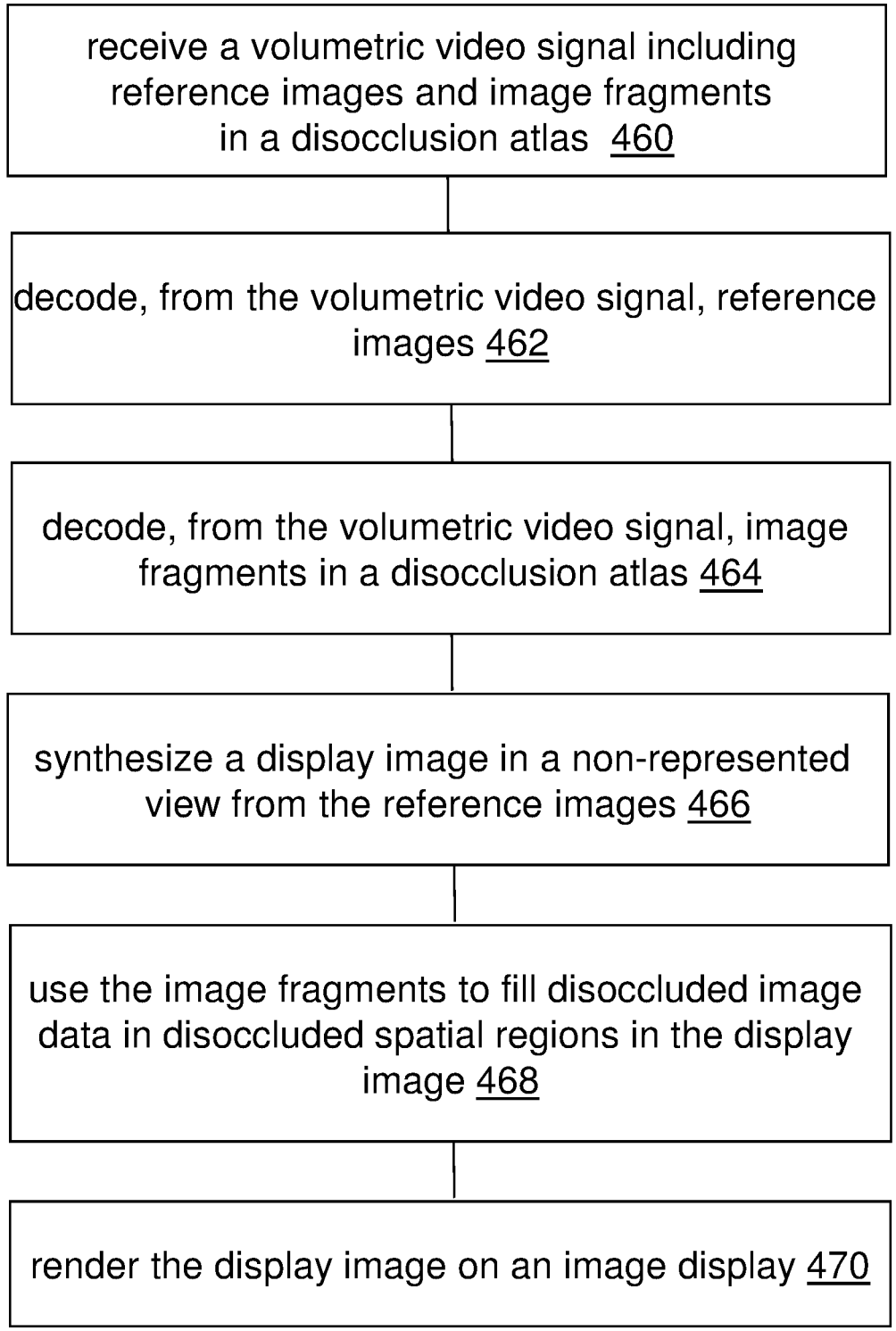

FIG. 4C illustrates an example process flow according to an example embodiment of the present invention. In some example embodiments, one or more computing devices or components may perform this process flow.

In block 460, a downstream decoder (e.g. a recipient device or decoder), receives a volumetric video signal. The volumetric video signal may be encoded/generated with any of the embodiments described above, e.g. with reference to FIG. 4B. The volumetric video signal is encoded with one or more reference images and image fragments in a disocclusion atlas. The disocclusion atlas is used for storing the image fragments The image fragments that are occluded in the one or more reference images depicting a visual scene from one or more reference views. and that become at least partly disoccluded in non-reference views adjacent to the one or more reference views are sorted in sized as described with reference to FIG. 4B, block 422.

In block 462, the downstream device decodes, from a volumetric video signal, one or more reference images.

In block 464, the downstream device decodes, from the volumetric video signal, image fragments in a disocclusion atlas.

In block 466, the downstream device synthesizes, based on the one or more reference images, a display image in a non-represented view.

In block 468, the downstream device uses the image fragments in the disocclusion atlas to fill disoccluded image data in disoccluded spatial regions in the display image.

In block 470, the upstream device renders the display image on an image display.

In an embodiment, each of the image fragments includes, for a spatial region formed by contiguous pixels occluded in the one or more reference views, texture image values and depth image values.

In an embodiment, in block 466, synthesizing the display image comprises using texture image values and depth image values available for the one or more reference views.

In an embodiment, the disoccluded spatial regions in the synthesized display image are identified by determining that the texture image values and the depth image values available for the one or more reference views, are not obtainable for the non-reference views adjacent to the one or more reference views.

In an embodiment, the image fragments stored in the disocclusion atlas are located in one or more saliency regions identified from the visual scene, and wherein the disocclusion atlas does not include any texture image values or depth image values to cover spatial regions away from the one or more saliency regions such that one or more saliency regions are identified in the synthesized display image.

In an embodiment, the volumetric video signal includes image metadata that specifies an injective function; the injective function maps each pixel in the image fragments from a pixel location of the pixel in an image frame to a corresponding location in a three-dimensional coordinate system in which the visual scene is represented.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

9. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
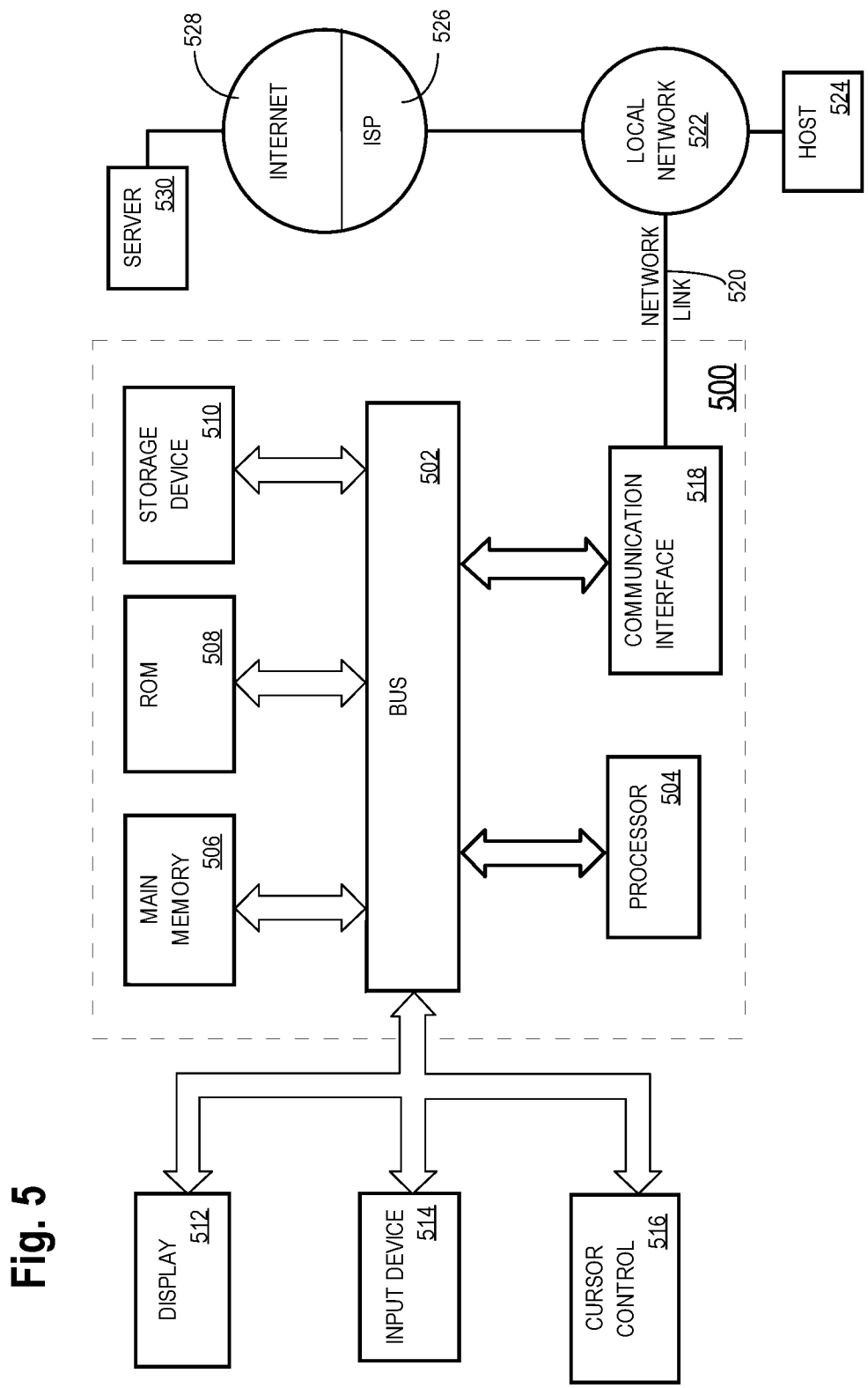
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

10. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Aspects of some embodiments include the following enumerated example embodiments (EEEs):

EEE1. A method comprising:
sorting, in size, image fragments that are occluded in one or more reference images depicting a visual scene from one or more reference views and that become at least partly disoccluded in non-reference views adjacent to the one or more reference views, the image fragments including a first image fragment that is no less in size than any other image fragment in the image fragments;
generating a layout mask for a disocclusion atlas used to store the image fragments, the layout mask being covered with a quadtree that includes a first best fit node specifically sized for the first image fragment, the disocclusion atlas being a combined image of minimal total area that contains multiple non-overlapping image fragments;
storing the sorted image fragments in a descending order into best fit nodes identified in the layout mask, each image fragment in the sorted image fragments being stored in a respective best fit node in the best fit nodes, the best fit nodes including at least one best fit node that is obtained by iteratively dividing at least one node in the quadtree that covers the layout mask;
generating a volumetric video signal encoded with the one or more reference images, the volumetric video signal being further encoded with the image fragments in the disocclusion atlas, the one or more reference images being used by a recipient device of the volumetric video signal to synthesize a display image in a non-represented view for rendering on an image display, the image fragments in the disocclusion atlas to be used by the recipient device to fill disoccluded image data in disoccluded spatial regions in the display image.

EEE2. The method of EEE1, wherein each of the one or more reference images represents one of: a 360 degree image, a 180 degree image, a viewport image, an image in a regular spatial shape image frame, or an image in an irregular spatial shape image frame.

EEE3. The method of EEE1 or EEE2, wherein each of the image fragments includes, for a spatial region formed by contiguous pixels occluded in the one or more reference views, texture image values and depth image values.

EEE4. The method of any of EEEs 1-3, wherein the one or more reference images are included in a multi-view image in a multi-view image group comprising a plurality of consecutive multi-view images for a plurality of consecutive time points; wherein the disocclusion atlas is included in a disocclusion atlas group comprising a plurality of disocclusion atlases for the plurality of consecutive time points.

EEE5. The method of any of EEE4, wherein the layout mask is included in a plurality of individual layout masks generated for the plurality of disocclusion atlases; wherein a group-level layout mask is generated from the plurality of individual layout masks through union operations; wherein the disocclusion atlas encoded in the volumetric video signal is represented in the group-level layout mask.

EEE6. The method of EEE4 or EEE5, wherein the disocclusion atlas group is encoded in the volumetric video signal as a group of atlas frames; wherein the group of atlas frames starts with an atlas I-frame and ends before a different atlas I-frame.

EEE7. The method of any of EEEs 1-6, wherein the disocclusion atlas includes mask striping; wherein the mask striping indicates that an image fragment stored in the disocclusion atlas borders at one or more boundaries of image segments.

EEE8. The method of any of EEEs 1-7, wherein the layout mask is expanded in response to determining that a best fit node is not found within a pre-expanded size of the layout mask.

EEE9. The method of any of EEEs 1-8, wherein spatial regions for the image fragments are identified in a bit mask; wherein the image fragments are sorted using sizes of the spatial regions for the image fragments.

EEE10. The method of any of EEEs 1-9, wherein the image fragments stored in the disocclusion atlas are located in one or more saliency regions identified from the visual scene.

EEE11. The method of EEE10, wherein the one or more saliency video streams includes a first saliency video stream assigned with a first saliency rank and a second saliency video stream assigned with a second saliency rank lower than the first saliency rank.

EEE12. A method comprising:
decoding, from a volumetric video signal, one or more reference images;
decoding, from the volumetric video signal, image fragments in a disocclusion atlas;
synthesizing a display image in a non-represented view from the one or more reference images;
using the image fragments in the disocclusion atlas to fill disoccluded image data in disoccluded spatial regions in the display image;
rendering the display image on an image display.

EEE13. The method of any of EEEs 1-12, wherein the volumetric video signal includes image metadata that specifies an injective function; wherein the injective function maps each pixel in the image fragments from a pixel location of the pixel in an image frame to a corresponding location in a three-dimensional coordinate system in which the visual scene is represented.

EEE14. A non-transitory computer readable storage medium, storing software instructions, which when executed by one or more processors cause performance of the method recited in any of EEEs 1-13.

EEE15. A computing device comprising one or more processors and one or more storage media, storing a set of instructions, which when executed by one or more processors cause performance of the method recited in any of EEEs 1-13.

The invention claimed is:

1. A method comprising:
sorting, in size, image fragments that are occluded in one or more reference images depicting a visual scene from one or more reference views and that become at least partly disoccluded in non-reference views adjacent to the one or more reference views, the image fragments including a first image fragment that is no less in size than any other image fragment in the image fragments;
generating a layout mask for a disocclusion atlas used to store the image fragments, the layout mask being covered with a quadtree that includes a first best fit node sized for covering the first image fragment, the disocclusion atlas being a combined image of minimal total area that contains multiple non-overlapping image fragments;
storing the sorted image fragments in a descending order into best fit nodes identified in the layout mask, wherein each of the best fit nodes is identified as a quadtree node of a minimum size for completely covering each of the respective image fragments, each image fragment in the sorted image fragments being stored in the respective best fit node, the best fit nodes including at least one best fit node that is obtained by iteratively dividing at least one node in the quadtree that covers the layout mask;
generating a volumetric video signal encoded with the one or more reference images, the volumetric video signal being further encoded with the image fragments in the disocclusion atlas, the one or more reference images for use by a recipient device of the volumetric video signal to synthesize a display image in a non-represented view for rendering on an image display, the image fragments in the disocclusion atlas for use by the recipient device to fill disoccluded image data in disoccluded spatial regions in the display image.

2. The method of claim 1, wherein each of the one or more reference images represents one of: a 360 degree image, a 180 degree image, a viewport image, an image in a regular spatial shape image frame, or an image in an irregular spatial shape image frame.

3. The method of claim 1, wherein each of the image fragments includes, for a spatial region formed by contiguous pixels occluded in the one or more reference views, texture image values and depth image values.

4. The method of claim 1, wherein the one or more reference images are included in a multi-view image in a multi-view image group comprising a plurality of consecutive multi-view images for a plurality of consecutive time points; wherein the disocclusion atlas is included in a disocclusion atlas group comprising a plurality of disocclusion atlases for the plurality of consecutive time points.

5. The method of claim 4, wherein the layout mask is included in a plurality of individual layout masks generated for the plurality of disocclusion atlases; wherein a group-level layout mask is generated from the plurality of individual layout masks through union operations; wherein the disocclusion atlas encoded in the volumetric video signal is represented in the group-level layout mask.

6. The method of claim 4, wherein the disocclusion atlas group is encoded in the volumetric video signal as a group of atlas frames; wherein the group of atlas frames starts with an atlas I-frame and ends before a different atlas I-frame.

7. The method of claim 1, wherein the disocclusion atlas includes mask striping; wherein the mask striping indicates that an image fragment stored in the disocclusion atlas borders at one or more boundaries of image segments.

8. The method of claim 1, wherein the layout mask is expanded in response to determining that a best fit node is not found within a pre-expanded size of the layout mask.

9. The method of claim 1, wherein spatial regions for the image fragments are identified in a bit mask; wherein the image fragments are sorted using sizes of the spatial regions for the image fragments.

10. The method of claim 1, wherein the image fragments stored in the disocclusion atlas are located in one or more saliency regions identified from the visual scene.

11. A method comprising:
receiving a volumetric video signal encoded with one or more reference images and image fragments in a disocclusion atlas according to the method of any preceding claim;
decoding, from the volumetric video signal, the one or more reference images;
decoding, from the volumetric video signal, the image fragments in the disocclusion atlas;
synthesizing a display image in a non-represented view from the one or more reference images;
using the image fragments in the disocclusion atlas to fill disoccluded image data in disoccluded spatial regions in the display image;
rendering the display image on an image display.

12. The method of claim 11, wherein each of the image fragments includes, for a spatial region formed by contiguous pixels occluded in the one or more reference views, texture image values and depth image values.

13. The method of claim 11, wherein synthesizing the display image comprises using texture image values and depth image values available for the one or more reference views.

14. The method of claim 13, wherein the disoccluded spatial regions in the synthesized display image are identified by determining that the texture image values and the depth image values available for the one or more reference views, are not obtainable for the non-reference views adjacent to the one or more reference views.

15. The method of claim 12, wherein the image fragments stored in the disocclusion atlas are located in one or more saliency regions identified from the visual scene, and wherein the disocclusion atlas does not include any texture image values or depth image values to cover spatial regions away from the one or more saliency regions such that one or more saliency regions are identified in the synthesized display image.

16. The method of claim 1, wherein the volumetric video signal includes image metadata that specifies an injective function; wherein the injective function maps each pixel in the image fragments from a pixel location of the pixel in an image frame to a corresponding location in a three-dimensional coordinate system in which the visual scene is represented.

17. A non-transitory computer readable storage medium, storing software instructions, which when executed by one or more processors cause performance of the method recited in claim 1.

18. A computing device comprising one or more processors and one or more storage media, storing a set of instructions, which when executed by one or more processors cause performance of the method recited in claim 1.

* * * * *